July 2, 1957  LE ROY ROOT  2,797,839
VANITY BOX
Filed Aug. 16, 1954
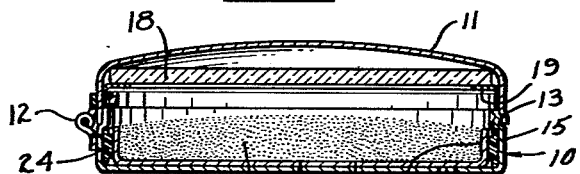
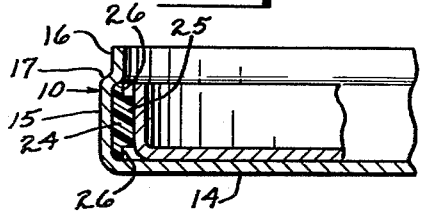
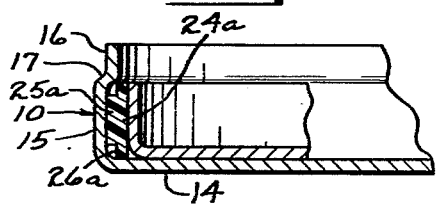
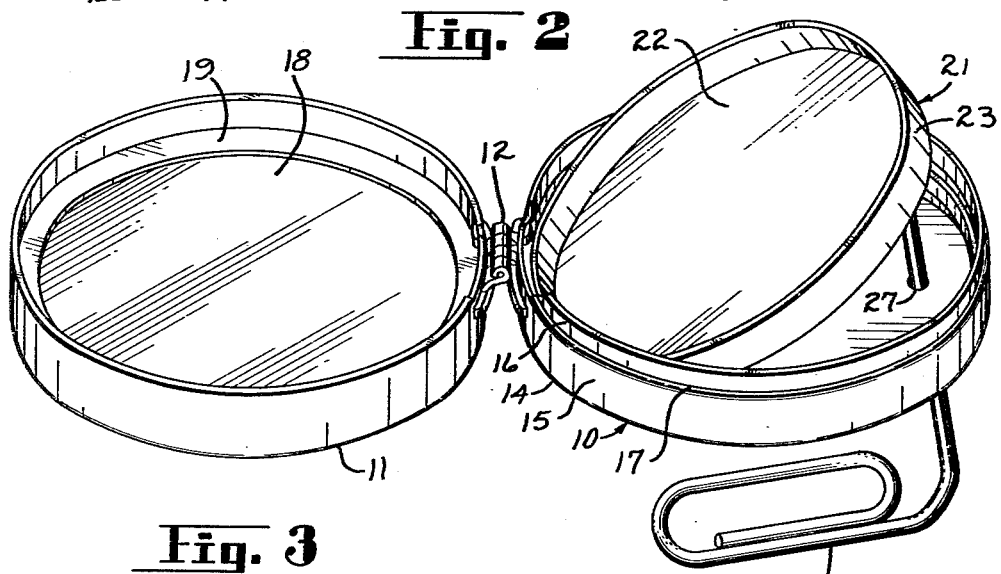
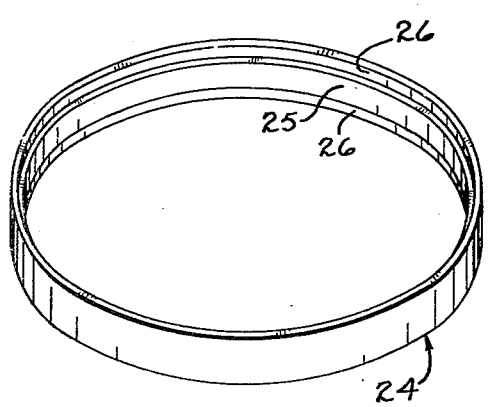
INVENTOR
LeRoy Root
BY
H. T. Johnston
ATTORNEY

United States Patent Office 2,797,839
Patented July 2, 1957

2,797,839
VANITY BOX

Le Roy Root, Stamford, Conn., assignor to Scovill Manufacturing Company, Waterbury, Conn., a corporation of Connecticut Application August 16, 1954, Serial No. 449,884

1 Claim. (Cl. 220—17)

This invention relates to vanity boxes and particularly to an improved means for holding the powder or rouge pan in assembled position within the body of the box.

Heretofore it was customary to hold rouge pans or cake powder pans, hereinafter called the container pan, in the body shell by cementing or glueing which was costly and unsightly and made no allowance for a refill when the original contents were used up. Some boxes which have been constructed to accommodate a refill have required the use of a retaining spider or spring attachments which were costly to manufacture and also by reason of the construction occupied a considerable amount of space between the body and pan, which resulted in an unsightly gap between the pan and body and also necessitated a cutting down on the size of the container pan or else making the vanity box larger.

The object of my invention is to provide an improved vanity box which will overcome the above objections, which will be simple and economical in construction, in which the container pan is readily replaceable, and which will have a neat appearance.

Other objects and advantages will become apparent from the following specification in conjunction with the accompanying drawing, in which—

Fig. 1 is a cross sectional view of a vanity box embodying my invention.

Fig. 2 is a perspective view of the box in open position and showing how the container pan is removed.

Fig. 3 is a perspective view of the plastic retainer ring.

Fig. 4 is a fragmentary sectional view through the box and assembled parts on an enlarged scale, and Fig. 5 is a similar view showing a modification in which the retainer ring is in a revised position.

The vanity case may be of any desired shape, the one shown comprising a round body 10 closed with a cover 11 hinged to the body 12 and held in closed position by a lock nib 13. The body 10 has a flat bottom 14 and an upstanding rim or wall 15. The upper end of the wall 15 is preferably formed with an inwardly offset neck 16 joined to the wall 15 by a connecting shoulder 17. The neck serves to receive the cover 10 and hold it stable relative to the body when in closed position. The cover 11 may be equipped with a mirror 18 held in place by a bezel or retaining ring 19.

Rouge material, and in many cases face powder, is now supplied in a compact cake and held in a dish-shaped pan. In the drawing, the compact material is indicated by the numeral 20 shown compacted into a dish-shaped container pan 21 having a flat base 22 and an upstanding rim or side wall 23.

The invention pertains particularly to the means for releasably holding the pan 21 in position within the body 10. The retaining means is in the form of a continuous ring 24 preferably made of polyethylene material that in thin strips has a considerable degree of flexibleness, and the material itself has some degree of resiliency. Specifically the ring has a relatively thick middle portion 25 on both sides of which are edge portions 26 of reduced thickness. In the preferred ring 24 shown in Figs. 1–4, its thick portion 25 projects radially inwardly and when assembled into the body 10 the I. D. of the thick middle portion is slightly less than the I. D. of the body neck 16.

The O. D. of the ring 24 is such that it fits within the body 10 below the neck 16 and its height is such that it can be located underneath the shoulder 17 for holding the ring in assembled position in said body. The thick portion 25 of the ring 24 has a slightly less inside diameter than the diameter of the pan wall 23, so that when the pan 21 is telescopically forced into the thick middle portion 25, the ring 24 will expand against the rim or wall 15 and frictionally hold the pan in the body 10. The fact that there is some degree of resiliency to the polyethylene material from which the ring 24 is made allows for the above construction and assembly where the pan 21 may be forced into the ring 24 and held in the body 10 under all conditions and only released by being forcibly pushed outwardly therefrom.

It is to be noted that the O. D. of the ring 24 in its normal round state is considerably greater than the I. D. of the body neck 16, and in view of the fact that the ring 24 is made of polyethylene material it is quite flexible and can be collapsed or buckled so that it can slip by the I. D. of the body neck 16 after which it will expand to its normal ring shape and fit into the body 10 underneath the neck 16. The ring 24 is preferably made with the thin edge portions 26 at both ends so as to make it symmetrical and thus requiring no orientation of the ring when assembling it into the body, i. e., it can be assembled in either direction. Furthermore, the thick middle portion 25 of the ring is considerably narrower than the overall height of the ring which allows for a greater degree of resiliency in the radial direction so as not to apply an excessive amount of friction upon the pan when assembling it into or removing it from the body 10.

In order to remove the pan when the compact material is exhausted and replace it with a refill, the bottom 14 of the body 10 is provided with a small hole 27 through which an instrument may be inserted for pushing the pan 21 outwardly from the ring 24. The hole 27 is preferably placed relatively close to one edge of the body so that the instrument inserted through said hole will have some leverage in pushing the pan out of said ring. One of the handy devices that may be employed for removing the pan is a paper clip 28 that may have one of its ends straightened out and inserted through the hole 27 in the manner as shown in Fig. 2.

In the modified form of invention shown in Fig. 5, the polyethylene ring 24a differs from that shown in the first form in that the thicker portion 25a extends radially outwardly and bears against the inner surface of the body wall 15. The reduced edge portions 26a have their inner surfaces coextensive with the inner surface of the ring 24a, and it is against this inside surface of the ring 24a that the container pan 21 is adapted to telescope and frictionally engage when assembled into the box. In this case the upper thin edge 26a will readily flex inwardly when the pan is being inserted. The ring 24a, similar to the first form, is adapted to fit underneath the neck shoulder 17 of the body 10 so that it cannot accidentally drop out of the body 10 even if the container pan 21 is not assembled therein.

Minor changes in details of construction and arrangement of parts may be made without departing from the scope of the present invention as set forth in the appended claim.

I claim:

A vanity box comprising a relatively shallow body and cover hingedly connected together, said body consisting of a flat bottom, an upstanding rim and a narrow and inwardly off-set neck for telescopically receiving said cover, said neck being integrally joined to the rim by a circumferential connecting shoulder, a continuous uninterrupted annular retainer ring of resilient plastic material fitted into said body, and said retainer ring having a smooth cylindrical inner surface and dimensioned to extend substantially from the bottom to the shoulder and to engage underneath the shoulder, and a shallow container pan assembled into said body and seated against said bottom, said pan having a cylindrical rim in tight frictional engagement with said smooth inner surface of the retainer ring.

References Cited in the file of this patent

UNITED STATES PATENTS

| | | |
|---|---|---|
| 1,734,859 | Kendall | Nov. 5, 1929 |
| 2,102,164 | Payson | Dec. 14, 1937 |
| 2,314,543 | Kope | Mar. 23, 1943 |

FOREIGN PATENTS

| | | |
|---|---|---|
| 335,530 | Great Britain | Sept. 24, 1930 |